(12) United States Patent
Andries et al.

(10) Patent No.: US 7,947,756 B2
(45) Date of Patent: May 24, 2011

(54) PROCESS FOR MAKING VISCO-ELASTIC FOAMS

(75) Inventors: Kris Andries, Molenstede (BE); Johan Antoine Stefaan Macken, Tildonk (BE)

(73) Assignee: Huntsman International LLC, The Woodlands, TX (US)

( * ) Notice: Subject to any disclaimer, the term of this patent is extended or adjusted under 35 U.S.C. 154(b) by 397 days.

(21) Appl. No.: 12/307,018

(22) PCT Filed: Jun. 12, 2007

(86) PCT No.: PCT/EP2007/055740
§ 371 (c)(1),
(2), (4) Date: Dec. 30, 2008

(87) PCT Pub. No.: WO2008/003567
PCT Pub. Date: Jan. 10, 2008

(65) Prior Publication Data
US 2009/0286897 A1    Nov. 19, 2009

(30) Foreign Application Priority Data

Jul. 4, 2006 (EP) .................................... 06116587

(51) Int. Cl.
*C09K 3/00* (2006.01)
*C08L 75/00* (2006.01)
*C08G 18/00* (2006.01)
*C07C 43/00* (2006.01)

(52) U.S. Cl. .............. 521/174; 252/182.25; 252/182.27; 521/137; 521/155; 521/170; 528/76; 568/620

(58) Field of Classification Search ............. 252/182.25, 252/182.27; 521/137, 155, 170, 174; 528/76; 568/620
See application file for complete search history.

(56) References Cited

U.S. PATENT DOCUMENTS

| 4,839,397 A | 6/1989 | Lohmar et al. | |
| 5,631,319 A * | 5/1997 | Reese et al. | 524/590 |
| 5,688,835 A * | 11/1997 | Scherbel et al. | 521/131 |
| 6,046,298 A * | 4/2000 | Beuer et al. | 528/74.5 |
| 2005/0014857 A1* | 1/2005 | Heinemann et al. | 521/155 |
| 2006/0270747 A1* | 11/2006 | Griggs | 521/172 |
| 2009/0264547 A1* | 10/2009 | Klesczewski et al. | 521/156 |

FOREIGN PATENT DOCUMENTS

| DE | 1113810 | 9/1961 |
| DE | 3316652 A1 | 12/1984 |
| DE | 3710731 | 4/1989 |
| DE | 19936481 A1 | 2/2001 |

OTHER PUBLICATIONS

Oertel, Dr. G., Polyurethane Handbook, 2$^{nd}$ edition, Section 5.1 "Slabstock Foams", p. 178-; Hauser Publishers, 1993.
Woods, G., ICI Polyurethanes Book, 2$^{nd}$ edition, 1990, pp. 32-35.

* cited by examiner

*Primary Examiner* — Mark Eashoo
*Assistant Examiner* — Melissa Rioja
(74) *Attorney, Agent, or Firm* — Robert A. Diaz

(57) ABSTRACT

Process for making a slabstock, visco-elastic, flexible, polyurethane foam which process comprises reacting a polyisocyanate and a polyol at an index of 60-95 and using a blowing agent, wherein 5-50 and preferably 10-40% by weight of the polyol used is castor oil. The foams and a polyol composition are claimed as well.

8 Claims, No Drawings

PROCESS FOR MAKING VISCO-ELASTIC FOAMS

CROSS REFERENCE TO RELATED APPLICATIONS

This application is the National Phase of International Application PCT/EP2007/055740 filed Jun. 12, 2007 which designated the U.S. and which claimed priority to European (EP) Pat. App. No. 06116587.4 filed Jul. 4, 2006. The noted applications are incorporated herein by reference.

The present invention is related to a novel process to prepare slabstock, visco-elastic foams. Such foams are traditionally made from polyether polyols which are made from ingredients obtained from treatment of crude oil.

Since crude oil is a resource which is not infinitely available there is a need to look for replacement.

Surprisingly, we have found that (unmodified) castor oil is a good alternative for part of the polyether polyols used in slabstock, visco-elastic foams. Further the foams are more attractive from an olfaction point of view.

DE-19936481 proposes the use of modified castor oil in making sound insulating foams. In the examples a small amount of castor oil was employed. Visco-elastic foams have not been mentioned. DE-3316652 discloses the used of castor oil in making sound insulating foams having a density of at least 120 kg/m³. The use of castor oil in substantial amount in making slabstock, visco-elastic foams has never been proposed.

Therefore the present invention is related to a process for making a slabstock, visco-elastic, flexible, polyurethane foam which process comprises reacting a polyisocyanate and a polyol at an index of 60-95 and using a blowing agent, wherein the polyol is a polyol composition comprising b1) a polyoxyethylene-polyoxypropylene polyol, having an average nominal hydroxy functionality of 2-4 and an average equivalent weight of 1000-3000, wherein the oxyethylene (EO) is present as tipped EO and/or random EO, the total EO content being 50-90% by weight;

b2) a polyoxyethylene-polyoxypropylene polyol, having an average nominal hydroxy functionality of 2-4 and an average equivalent weight of 1000-3000, wherein the EO is present as random EO and/or tipped EO, the total EO content being between 5 and 25% by weight; and b3) castor oil; and optionally b4) a polyoxypropylene polyol, having an average nominal hydroxy functionality of 3-6 and an average equivalent weight of 100-600; and optionally b5) a polyoxyalkyleneglycol having an average molecular weight from 150 to 1200; the amounts of these compounds b1, b2, b3, b4 and b5 being (based on the combined weights of b1, b2, b3, b4 and b5): b1: 10-40 wt %, b2: 10-40 wt %, b3: 5-50 wt %, b4: 0-40 wt %, b5: 0-30 wt %. The foams preferably have a density of 30-100 and more preferably of 40-90 kg/m³. The present invention further relates to the foams obtained according to this process.

In the context of the present invention the following terms have the following meaning:

1) isocyanate index or NCO index or index:

the ratio of NCO-groups over isocyanate-reactive hydrogen atoms present in a formulation, given as a percentage:

$$\frac{[NCO] \times 100(\%)}{[\text{active hydrogen}]}.$$

In other words the NCO-index expresses the percentage of isocyanate actually used in a formulation with respect to the amount of isocyanate theoretically required for reacting with the stoichiometric amount of isocyanate-reactive hydrogen used in a formulation.

It should be observed that the isocyanate index as used herein is considered from the point of view of the actual polymerisation process preparing the foam involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols) are not taken into account in the calculation of the isocyanate index. Only the free isocyanate groups and the free isocyanate-reactive hydrogens (including those of the water) present at the actual polymerisation stage are taken into account.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanates are kept in one or more containers separate from the isocyanate-reactive components.

4) The expression "polyurethane foam" as used herein refers to products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-urethane foams).

5) The term "average nominal hydroxyl functionality" is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

6) The word "average" refers to number average unless indicated otherwise.

7) "Density" is measured according to ISO 845 and is the core density unless specified otherwise.

8) A visco-elastic foam is defined as a foam having a resilience of at most 40%, as measured according to ISO 8307 and a hysteresis loss of more than 40%, as measured according to ISO 3386-1.

9) The following way of describing polyols is used in the present application: A PO-EO polyol is a polyol having first a PO block attached to the initiator followed by an EO block. A PO-PO/EO polyol is a polyol having first a PO block and then a block of randomly distributed PO and EO. A PO-PO/EO-EO polyol is a polyol having first a PO block, then a block of randomly distributed PO and EO and then a block of EO. In the above descriptions only one tail of a polyol is described (seen from the initiator); the nominal hydroxyl functionality will determine how many of such tails will be present. PO stands for oxypropylene and EO for oxyethylene in this context.

10) Castor oil refers to unmodified castor oil which means that no chemical modifications, like alkoxylation, took place. Unmodified castor oils include castor oils which have been treated by physico-chemical means like purification and discoloration.

11) Slabstock foam: any foam made under conditions as described in the Polyurethane Handbook by Dr. G. Oeitel, $2^{nd}$ edition, Hauser Publishers, 1993, Section 5.1 "Slabstock Foams" (starting at page 178).

The polyisocyanates preferably are selected from aromatic polyisocyanates like toluene diisocyanate and preferably diphenylmethane diisocyanate (MDI), mixtures of MDI with homologues thereof having an isocyanate functionality of 3 or more, which mixtures are widely known as crude or polymeric MDI, and isocyanate-terminated variants of these polyisocyanates, such variants containing urethane, uretonimine, carbodiimide, urea, isocyanurate, allophanate and/or biuret groups. Mixtures of these polyisocyanates may be used as well.

Most preferably the polyisocyanate is selected from 1) a diphenylmethane diisocyanate comprising at least 40%, preferably at least 60% and most preferably at least 80% by weight of 4,4'-diphenylmethane diisocyanate and the following preferred variants of such diphenylmethane diisocyanate: 2) a carbodiimide and/or uretonimine modified variant of polyisocyanate 1), the variant having an NCO value of 20% by weight or more; 3) a urethane modified variant of polyisocyanate 1), the variant having an NCO value of 20% by weight or more and being the reaction product of an excess of polyisocyanate 1) and of a polyol having an average nominal hydroxyl functionality of 2-4 and an average molecular weight of less than 1000; 4) a prepolymer having an NCO value of 10% by weight or more and preferably of 15% by weight or more and which is the reaction product of an excess of any of the aforementioned polyisocyanates 1-3) and of a polyol having an average nominal functionality of 2-6, an average molecular weight of 1000-12000 and preferably an hydroxyl value of 15 to 60 mg KOH/g; 5) diphenylmethane diisocyanates comprising homologues having 3 or more isocyanate groups; and 6) mixtures of any of the aforementioned polyisocyanates.

Polyisocyanate 1) comprises at least 40% by weight of 4,4'-MDI. Such polyisocyanates are known in the art and include pure 4,4'-MDI and isomeric mixtures of 4,4'-MDI and up to 60% by weight of 2,4'-MDI and 2,2'-MDI. It is to be noted that the amount of 2,2'-MDI in the isomeric mixtures is rather at an impurity level and in general will not exceed 2% by weight, the remainder being 2,4'-MDI and 4,4'-MDI. Polyisocyanates as these are known in the art and commercially available; for example Suprasec™ MPR ex Huntsman Polyurethanes, which is a business of Huntsman International LLC (who owns the Suprasec trademark).

The carbodiimide and/or uretonimine modified variants of the above polyisocyanate 1) are also known in the art and commercially available; e.g. Suprasec 2020, ex Huntsman. Urethane modified variants of the above polyisocyanate 1) are also known in the art, see e.g. The ICI Polyurethanes Book by G. Woods 1990, $2^{nd}$ edition, pages 32-35. Aforementioned prepolymers of polyisocyanate 1) having an NCO value of 10% by weight or more are also known in the art. Preferably the polyol used for making these prepolymers is selected from polyester polyols and polyether polyols.

Diphenylmethane diisocyanates comprising homologues having 3 or more isocyanate groups are widely known in the art as crude or polymeric MDI and are commercially available; e.g. Suprasec 2185 and Suprasec DNR ex Huntsman.

Mixtures of the aforementioned polyisocyanates may be used as well, see e.g. The ICI Polyurethanes Book by G. Woods 1990, $2^{nd}$ edition, pages 32-35. An example of such a commercially available polyisocyanate is Suprasec 2021 ex Huntsman.

The polyol used is a polyol composition comprising
b1) a polyoxyethylene-polyoxypropylene polyol, having an average nominal hydroxy functionality of 2-4 and an average equivalent weight of 1000-3000, wherein the oxyethylene (EO) is present as tipped EO and/or random EO, the total EO content being 50-90% by weight;
b2) a polyoxyethylene-polyoxypropylene polyol, having an average nominal hydroxy functionality of 2-4 and an average equivalent weight of 1000-3000, wherein the EO is present as random EO and/or tipped EO, the total EO content being between 5 and 25% by weight; and
b3) castor oil; and optionally
b4) a polyoxypropylene polyol, having an average nominal hydroxy functionality of 3-6 and an average equivalent weight of 100-600; and optionally
b5) a polyoxyalkyleneglycol having an average molecular weight from 150 to 1200; the amounts of these compounds b1, b2, b3, b4 and b5 being (based on the combined weights of b1, b2, b3, b4 and b5); b1: 10-40 wt %, b2: 10-40 wt %, b3: 5-50 wt %, b4: 0-40 wt %, b5: 0-30 wt %. This polyol composition also forms part of the present invention.

Polyol b1 is an EO rich polyol. It can be prepared by known methods. It comprises PO and EO, where the EO can be random, tipped, or both. Preferably the EO is random in majority. The EO content is 50-90% by weight (over the total oxyalkylene units present). Such polyols are known and commercially available; e.g. Daltocel™ 444 and 555 ex Huntsman (Daltocel is a trademark of Huntsman International LLC).

Polyol b2 can have a structure of the type PO-PO/EO-EO, PO/EO-EO, PO-EO or PO/EO. The total EO content is between 5 and 25% by weight (over the total oxyalkylene units present). Such polyols are known and commercially available; e.g. Daltocel F435 and F428 ex Huntsman.

Castor oil preferably is used in an amount of 10-40% by weight based on the combined weights of b1, b2, b3, b4 and b5.

Polyol b4 is known and commercially available; e.g. Daltolac™ R251 ex Huntsman.

Polyol b5 is a polyoxyalkyleneglycol such as polyoxyethylene glycol (PEG) or polyoxypropylene glycol (PPG). A preferred polyol is a PEG diol.

Each component b1, b2, b4 and b5 may be comprised of mixtures. Dispersed material can also be present. This is known as polymer-modified polyol, and comprise e.g. SAN or PIPA (Poly Isocyanate Poly Addition), or PHD (Polyurea Dispersion). The polymer-modified polyols which are particularly interesting in accordance with the invention are products obtained by in situ polymerisation of styrene and/or acrylonitrile in poly(oxyethylene/oxypropylene)polyols and products obtained by in situ reaction between a polyisocyanate and an amino- or hydroxy-functional compound (such as triethanolamine) in a poly(oxyethylene/oxypropylene) polyol. The solids content (based on the total polyol weight b1+b2+b4+b5) can vary within broad limits, e.g. from 5 to 50%. Particle sizes of the dispersed polymer of less than 50 microns are preferred. Mixtures can be used as well.

The invention also relates to a specific polyol mixture, comprising the five polyols together, according to the following proportions, expressed on the basis of the combined weights of the polyols:

| | |
|---|---|
| b1: | 10-40% by weight |
| b2: | 10-40% by weight |
| b3: | 5-50% by weight and preferably 10-40% by weight |
| b4: | 0-40% by weight |
| b5: | 0-30% by weight. |

Water is preferably used as the blowing agent. Inert gases likes carbon dioxide may be added if needed. It is appropriate to use from 0.5 to 10%, preferably from 0.5 to 5% by weight of water based on the weight of the total polyol component (prereacted and not prereacted, i.e. the total starting polyol or total starting isocyanate-reactive compounds), where the water can optionally be used in conjunction with inert gas.

Other conventional ingredients (additives and/or auxiliaries) may be used in making the polyurethanes. These include catalysts, for example, tertiary amines and organic tin compounds, surfactants, cross linking or chain extending agents, for example, low molecular weight compounds such as other diols, triols (having a molecular weight below those specified for b1-b3) and diamines, fire retardants, for example, halogenated allyl phosphates and melamine, fillers and pigments. Foam stabilizers, for example polysiloxane-polyalkylene oxide block copolymers, may be used to stabilize or regulate the cells of the foam.

The amount of these minor ingredients used will depend on the nature of the product required and may be varied within limits well known to a polyurethane foam technologist.

These components, notably the polyols b1, b2, b3, b4 and b5 can be added in any order. The polyols can be added one after the other, or part by part, in any order (for example, part of b1, then the remainder of b1 together with the all of b2+b3+b4+b5 or all of b2 then all of b1 then all of b3 then all of b4 then all of b5).

The components of the polyurethane forming reaction mixture may be mixed together in any convenient manner; the individual components may be pre-blended so as to reduce the number of component streams which are to be brought together in the final mixing step. It is often convenient to have a two-stream system whereby one stream comprises the polyisocyanate or polyisocyanate prepolymer and the second stream comprises all the other components of the reaction mixture. The foams may be made according to the so called semi- or quasi-prepolymer process or the prepolymer process wherein part or all of the compounds b1-b5 are prereacted with the polyisocyanate and wherein the semi- or quasi-prepolymer or prepolymer is subsequently reacted with water and the remaining part of the compounds b1-b5, if any.

The foams may be used in the furniture industries in seating, in cushioning and in particular in mattresses.

The invention is illustrated with the following examples.

EXAMPLE 1

The following polyisocyanate mixture was made by combining and mixing the following ingredients (amounts are in parts by weight):

30.1 pbw of Suprasec 2185, 51.65 pbw of MDI comprising 17% wt of 2,4'-MDI and 18.25 pbw of a prepolymer, having an NCO value of about 13% by weight, were mixed. The prepolymer was made by reacting about 27 pbw of MDI (2,4'-MDI=15% w), about 16.5 pbw of Suprasec 2185 and about 57 pbw of Daltocel F428.

Then the following polyol composition was made by combining and mixing the following ingredients: amount (in parts by weight):

| | amount (in parts by weight): |
|---|---|
| Caradol SA 36-11 (b2 polyol); from Shell | 30 |
| Caradol MD 36-02 (b1 polyol); from Shell | 30 |
| Caradol SH 250-05 (b4 polyol); from Shell | 25 |
| PEG 400 (b5 polyol) | 10 |
| Castor oil ex Alberdingk-Boley | 20 |
| Water | 2.25 |
| Dabco 33 LV (catalyst ex Air Products) | 0.5 |
| Niax A1 (catalyst ex Osi) | 0.25 |
| Tegostab B8716LF (surfactant from Goldschmidt) | 0.25 |

65 parts by weight of the polyisocyanate was reacted with the polyol composition using a multi-component discontinuous slabstock device with a foaming box having dimensions 50×50×50 cm. The block obtained was left for 24 h under ambient conditions before cutting and testing. The foams obtained had a core density of 48 kg/m$^3$ (ISO 845), a resilience of 14% (ISO 8307) and a hysteresis loss of 58% (ISO 3386-1).

EXAMPLE 2

Comparative

Example 1 was repeated with the proviso that all the Caradol MD 36-02 was replaced with Caradol SA 36-11; the reaction was also conducted at index 87. The reaction was conducted in a bucket on the bench. The foam obtained showed recession to an extent that it would not be able to make suitable slabstock foams from such a composition and that no useful foam was obtained.

The invention claimed is:

1. Process for making a slabstock, visco-elastic, flexible, polyurethane foam which process comprises reacting a polyisocyanate and a polyol at an index of 60-95 and using a blowing agent, wherein the polyol is a polyol composition comprising
  b1) a polyoxyethylene-polyoxypropylene polyol, having an average nominal hydroxy functionality of 2-4 and an average equivalent weight of 1000-3000, wherein the oxyethylene (EO) is present as tipped EO and/or random EO, the total EO content being 50-90% by weight;
  b2) a polyoxyethylene-polyoxypropylene polyol, having an average nominal hydroxy functionality of 2-4 and an average equivalent weight of 1000-3000, wherein the EO is present as random EO and/or tipped EO, the total EO content being between 5 and 25% by weight; and
  b3) castor oil; and optionally
  b4) a polyoxypropylene polyol, having an average nominal hydroxy functionality of 3-6 and an average equivalent weight of 100-600; and optionally
  b5) a polyoxyalkyleneglycol having an average molecular weight from 150 to 1200; the amounts of these compounds b1, b2, b3, b4 and b5 being (based on the combined weights of b1, b2, b3, b4 and b5): b1: 10-40 wt %, b2: 10-40 wt %, b3: 5-50 wt %, b4: 0-40 wt %, b5: 0-30 wt %.

2. Process according to claim 1 wherein the density of the foam is 30-100 kg/m³.

3. Process according to claim 1 wherein the polyisocyanate is selected from diphenylmethane diisocyanate (MDI), mixtures of MDI with homologues thereof having an isocyanate functionality of 3 or more and isocyanate-terminated variants of these polyisocyanates, such variants containing urethane, uretonimine, carbodiimide, urea, isocyanurate, allophanate and/or biuret groups; and mixtures thereof.

4. Process according to claim 1 wherein the blowing agent is water.

5. Process according to claim 1 wherein the amount of castor oil is 10-40% by weight.

6. Visco-elastic foam made according to claim 1.

7. Polyol composition comprising
- b1) a polyoxyethylene-polyoxypropylene polyol, having an average nominal hydroxy functionality of 2-4 and an average equivalent weight of 1000-3000, wherein the oxyethylene (EO) is present as tipped EO and/or random EO, the total EO content being 50-90% by weight;
- b2) a polyoxyethylene-polyoxypropylene polyol, having an average nominal hydroxy functionality of 2-4 and an average equivalent weight of 1000-3000, wherein the EO is present as random EO and/or tipped EO, the total EO content being between 5 and 25% by weight; and
- b3) castor oil; and optionally
- b4) a polyoxypropylene polyol, having an average nominal hydroxy functionality of 3-6 and an average equivalent weight of 100-600; and optionally
- b5) a polyoxyalkyleneglycol having an average molecular weight from 150 to 1200; the amounts of these compounds b1, b2, b3, b4 and b5 being (based on the combined weights of b1, b2, b3, b4 and b5): b1: 10-40 wt %, b2: 10-40 wt %, b3: 5-50 wt %, b4: 0-40 wt %, b5: 0-30 wt %.

8. Polyol composition according to claim 7 wherein the amount of castor oil is 10-40% by weight.

* * * * *